Feb. 21, 1956  H. G. FERGUSON ET AL  2,735,416
PISTON AND CYLINDER CONSTRUCTION FOR
INTERNAL-COMBUSTION ENGINE
Filed Sept. 28, 1951  4 Sheets-Sheet 2
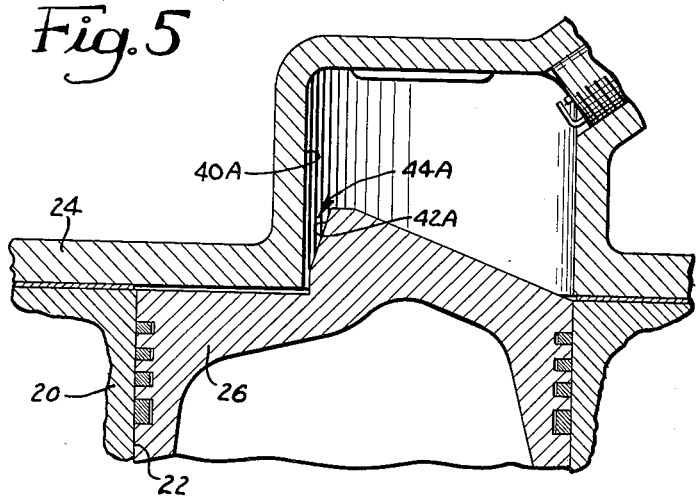
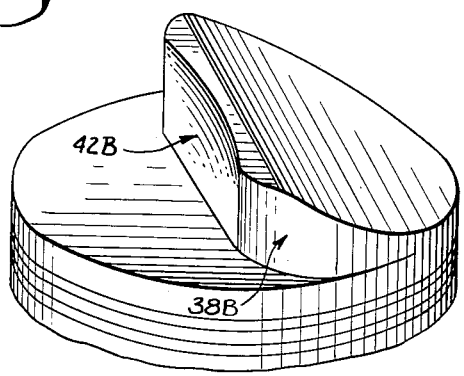
INVENTORS
Henry George Ferguson
Alexander Senkowski
William Henry Harrow
by: Carlson, Pitzner, Hubbard & Wolfe
attys.

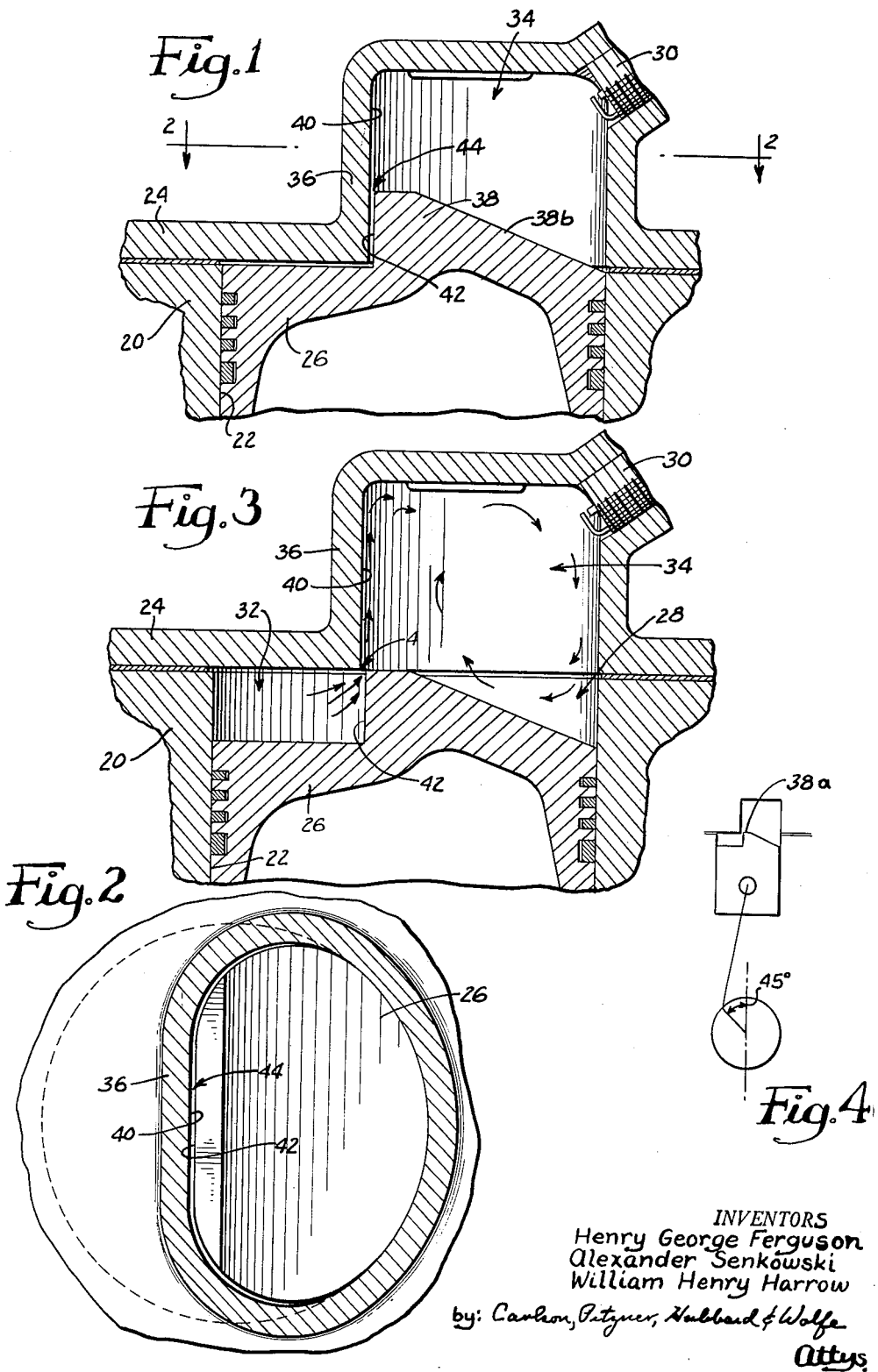

INVENTORS
Henry George Ferguson
Alexander Senkowski
William Henry Harrow

United States Patent Office 2,735,416
Patented Feb. 21, 1956

2,735,416

PISTON AND CYLINDER CONSTRUCTION FOR INTERNAL-COMBUSTION ENGINE

Henry George Ferguson, Stow-on-the-Wold, Alexander Senkowski, Earlsdon, Coventry, and William Henry Harrow, Coundon, Coventry, England, assignors, by mesne assignments, to Harry Ferguson, Inc., Detroit, Mich., a corporation of Delaware Application September 28, 1951, Serial No. 248,674

Claims priority, application Great Britain September 29, 1950

16 Claims. (Cl. 123—191)

The present invention relates generally to internal combustion engines and more particularly to the construction of pistons and cylinders for such engines.

Much study and experimentation has been devoted to the improvement and performance of internal combustion engines and some attention has been directed toward enhancing combustion by improving fuel vapor and air mixing and flame propagation within the combustion chamber defined by the cylinder, its head and the piston. Among these efforts is one wherein the cylinder head is so fashioned as to substantially mask a portion of the oppositely disposed surface of the piston as the latter approaches the limit of its stroke within the cylinder. More particularly this construction comprises the formation of the cylinder head with a downwardly projecting, flat surfaced portion disposed in opposed relation to the flat top surface of the piston, the former being arranged so as to be almost engaged by the latter at the top of its stroke. The result of this construction is that the charge of the fuel vapor and air mixture introduced into the cylinder is squeezed from between the outwardly projecting cylinder head portion and the opposed portion of the piston into the combustion chamber. The hope was that such displaced portion of the charge would cause a turbulence in the combustion chamber so as to enhance combustion. Recent tests, however, have indicated that such construction as a means of effecting turbulence and thus affecting combustion is of little if any value, and have also indicated that any improvement in engine performance may be merely the result of the fact that the combustion chamber is of more compact shape giving better flame travel conditions.

It is a general object of the present invention to provide a novel piston and cylinder construction for producing improved engine performance and particularly for producing more efficient utilization of fuel than heretofore possible by effecting severe turbulence in the compressed charge within the combustion chamber.

More specifically it is an object of the invention to provide an improved piston and cylinder construction which insures the production of turbulence in the charge of fuel vapor and air mixture in the compression chamber for a substantial portion of the compression stroke length of the piston so as to produce greater uniformity of mixing of the fuel vapor and air and to enhance flame propagation after ignition so as to effect increased engine operating efficiency.

The objects of the invention thus generally set forth together with other objects and ancillary advantages are shown by way of illustration in the accompanying drawings, in which:

Figure 1 is a fragmentary vertical section through a piston and cylinder for an internal combustion engine embodying the features of the present invention.

Fig. 2 is a fragmentary transverse section taken substantially in the plane of line 2—2 of Fig. 1.

Fig. 3 is a view similar to Fig. 1 but showing a different relative position of the piston with respect to the cylinder.

Fig. 4 is a diagrammatic representation of the piston and cylinder arrangement shown in the preceding figures and illustrating crankshaft position for the piston disposition illustrated in Fig. 3.

Fig. 5 is a view similar to Fig. 1 but illustrating a modified form of piston.

Fig. 6 is a fragmentary perspective view of still another modified form of piston.

Figure 7:
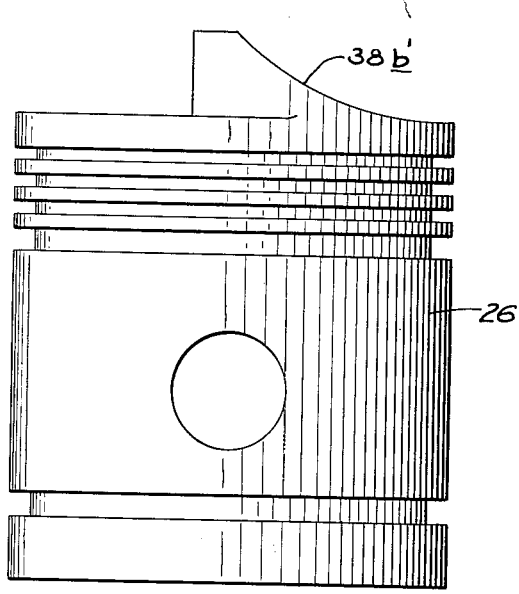
Fig. 7 is an elevational view of yet another type of piston.

While the invention is susceptible of various modifications and alternative constructions, there is shown in the drawings and will herein be described in detail the preferred embodiments, but it is to be understood that it is not thereby intended to limit the invention to the forms disclosed, but it is intended to cover all modifications and alternative constructions falling within the spirit and scope of the invention as expressed in the appended claims.

Referring more particularly to the drawings and especially to Figs. 1, 2 and 3, there shown is an engine block 20 having a cylindrical bore 22 therein which is closed at one end by a head 24. The portion of the block 20 defining the cylindrical bore 22 and the portion of the head 24 closing the upper end of the bore are ordinarily termed a cylinder. Reciprocable within the bore 22 is a piston 26. The piston together with the cylindrical wall of the bore 22 and the head 24 define a compartment generally designated 28 into which a combustible charge comprising a mixture of fuel vapor and air is introduced. After compression by upward movement of the piston 26 the charge is ignited by means of an electric spark from a conventional spark plug 30. Thus the charge is burned, and the resulting expansion drives the piston downwardly thereby converting the energy of the charge into useful work.

In carrying out the invention the cylinder and piston are especially constructed so that as the piston approaches the upper end of its stroke the compartment 28 is effectually divided into two chambers, a pump chamber 32 and a combustion chamber 34, with restricted communication being provided between the two. Thus a portion of the charge introduced into the compartment 28, upon upward movement of the piston 26 near the end or top of its compression stroke, is compressed in the pump chamber 32 and is forced therefrom into the combustion chamber 34 at high velocity. At the same time, this charge portion is directed so as to create turbulence in the compressed charge in the combustion chamber to insure complete mixing of the fuel vapor and air and to enhance flame propagation upon ignition by a spark from the plug 30.

As shown, the cylinder head 24 and the top of the piston 26 are formed with complementary projections or steps, generally designated 36 and 38, respectively, which interfit toward the top of the stroke of the piston. These steps include parallel faces 40 and 42, respectively, lying substantially parallel to the axis of the piston and cylinder. The faces extend transversely of the cylinder and piston and are spaced apart so as to define a narrow passage or duct 44. As indicated in Fig. 4, the height of the piston step 38 is such that the upper edge 38a thereof is oppositely disposed to the lower edge of the cylinder head step when there is approximately 45° of angular crankshaft travel left before the piston reaches a top dead center position. It is at this point that the piston and cylinder head steps cooperate to divide the compartment 28 into the two chambers 32 and 34. Continued upward movement of the piston toward its top dead center position increases the overlap of the spaced vertical faces 42 and 40 of the piston and cylinder head steps 38 and 36, and also traps a portion of the charge of fuel vapor and air mixture in the pump chamber 32 as well as continuing to compress that portion of the charge in the combustion chamber 34. As the piston continues to rise further toward its uppermost position, the trapped portion of the charge in the chamber 32 is ejected upwardly through the duct 44 defined by the overlapped faces 42 and 40 of the piston and cylinder head steps 38 and 36. Because of the relatively small cross-sectional area of the duct as compared to that of the pump chamber 32, the trapped portion of the charge is ejected therethrough at high velocity into the combustion chamber 34.

In an experimental engine equipped with a piston and cylinder construction formed in accordance with the present invention, with such engine operating at 1,000 R. P. M., the stream of compressed charge ejected from the pump chamber 32 into the combustion chamber 34 attained a calculated maximum velocity of approximately 170 feet per second. With this relatively high discharge velocity and with the discharge taking place over a large part of crankshaft travel near the top of the compression stroke (45° as noted above), and thus for a substantial length of time, the energy input into the combustion chamber 34 is substantial. This enables the charge within the combustion chamber to acquire a very high degree of turbulence before ignition thereof by operation of the spark plug 30.

It will be noted upon reference to Figs. 1 and 3 that the duct 44 defined by the vertical faces 42 and 40 of the piston and cylinder steps 38 and 36 is directed upwardly. Thus the stream of charge forced from the pump chamber 32 is directed vertically into the combustion chamber 34 and against the top wall thereof. The latter serves to deflect it generally toward the spark plug 30 and the wall of the combustion chamber 34 opposite the wall 40. Impingement of the charge stream on this opposite vertical wall of the cylinder head and the upper surface 38b of the piston outwardly of the step 38 and forming the bottom of the combustion chamber, assists in causing a swirling action to be effected so that a turbulence vortex having its axis approximately parallel to the ledge 38a of the piston step 38 is formed.

It will be apparent that with the form of piston and cylinder construction illustrated in Fig. 1, 2 and 3, the speed of the charge forced from the pump chamber 32 into the combustion chamber 34 is reduced as the piston approaches its top dead center position because of the decrease in the upward speed of the piston. In some instances it has been found particularly desirable that the speed of transfer of charge from the pump chamber to the combustion chamber remain constant throughout the period of the overlap of the piston and cylinder head steps 38 and 36. To this end, the shape of the piston step can be altered so that the cross-sectional area of the duct 44 is caused to decrease as the piston approaches its top dead center position. In the modified form shown in Figure 5, this is accomplished by slanting the face 42A of the piston step with respect to the axis of the piston. Thus as overlap of the piston and cylinder steps begins, the spacing between the step faces is relatively wide so that a duct 44A of relatively large area obtains. As the amount of overlap increases as the piston approaches its top dead center position, the spacing between the opposed faces 40A and 42A is gradually reduced with a corresponding reduction in duct area and an increase in velocity of the stream of charge forced from the pump chamber into the combustion chamber.

Turning now to the modified form of piston illustrated in Fig. 6, there shown is a piston step 38B having its generally vertical face 42B dished so as to provide a duct which varies in width along its length. In other words, a piston of this form used in conjunction with the cylinder head 24 having a step 36 presenting a flat planar vertical face 40 defines a duct having a maximum width at the center thereof adjacent the top of the piston and tapering toward a minimum width along the bottom and side edges thereof. Such a construction results in a generally central concentration of the stream of charge ejected from the pump chamber 32 into the combustion chamber 34 and thus a concentration of the energy input into the center of the combustion chamber. This charge stream therefore is directed generally toward the spark plug 30 which, as shown, is disposed at the upper corner of the combustion chamber 34 remote from the duct. Under certain conditions of operation such direction of the stream has proved favorable toward increasing operating efficiency.

Figure 8:
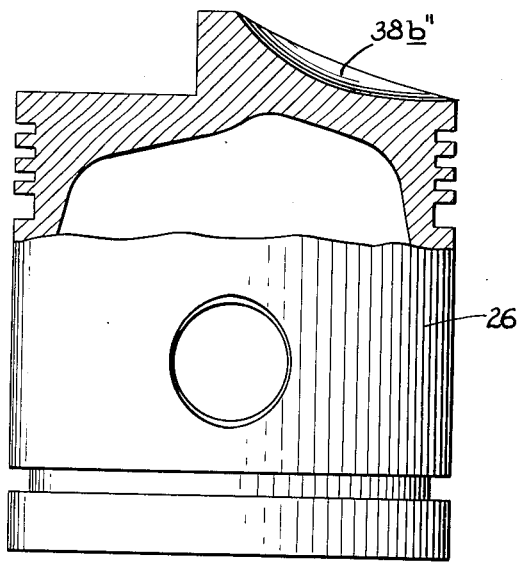
Fig. 8 is an elevational view partly in section of a still further modified form of piston.

In the forms of the invention thus far discussed, the piston step 38 has comprised a generally vertical face (42, 42A or 42B), for cooperation with a similarly disposed face of the cylinder head step 36, such piston face terminating in a narrow transverse horizontal ledge 38a which merges with a downwardly inclined plane surface 38b, with the latter terminating at substantially the same level as the lower horizontal face of the piston 26. While such piston crown formation has proved eminently satisfactory, it has been found that turbulence created by the action of the stream of charge introduced into the combustion chamber 34 might be enhanced by alteration of the shape of the transverse piston portion. As shown in Fig. 7, such portion 38b' has been fashioned to present a smooth arcuate surface; in Fig. 8 such portion 38b'' has been fashioned to present a concave or dished surface.

Figure 9:
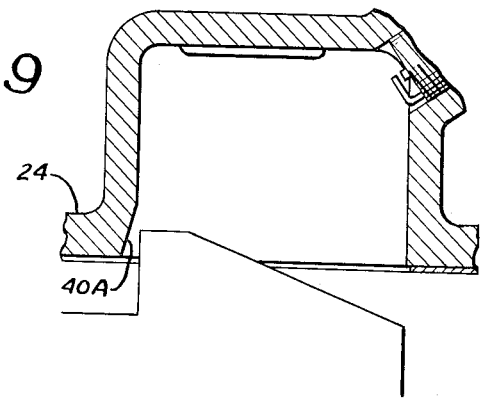
Figs. 9, 10 and 11 are vertical sections through modified forms of cylinder heads intended primarily for use with a piston of the type illustrated in Fig. 1.
Figure 10:
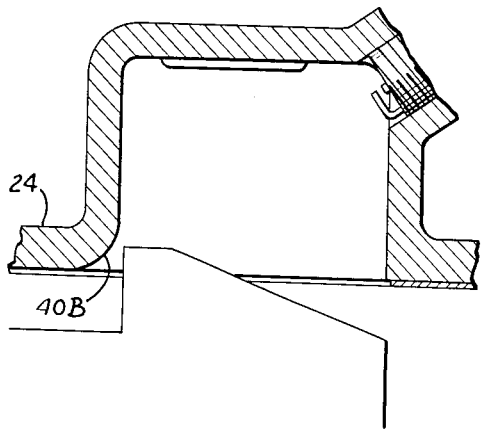

It will be apparent that while the foregoing has contemplated the use of various forms of piston crowns with the same type of cylinder head step formation, namely, one having a vertically disposed duct-defining face 40, the various results attained by alteration of the shape of the opositely disposed piston step face 42 can be achieved with equal facility by properly shaping the duct-forming face 40 of the cylinder head step 36. For example, the lower edge of the duct forming face of the cylinder head step 36 can be chamfered as shown at 40A in Fig. 9. Alternatively the cylinder head step can be rounded as shown at 40B in Fig. 10. When used with a piston 26 having a step 38 of the type illustrated in Fig. 1 and having a vertically disposed face 42, these cylinder head step forms produce results comparable to those achieved by the piston and cylinder combinations shown in Figs. 1–4, 5 and 6.

Figure 11:
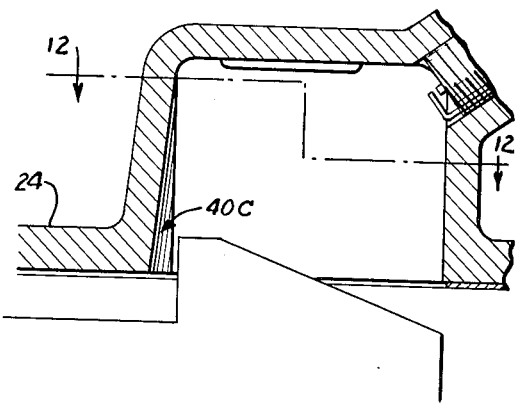
Figure 12:
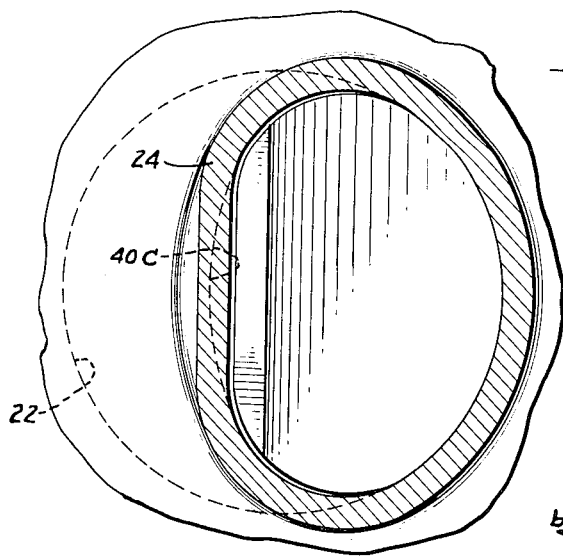
Fig. 12 is a transverse section taken substantially in the plane of line 12—12 in Fig. 11.

Similarly the duct-defining face 40C of the cylinder head step 36 can be dished (Figs. 11 and 12) in the same manner as the corresponding face 42B of the piston step 38 shown in Fig. 6. If desired, both the piston step and cylinder step duct-defining faces can be curved or otherwise shaped transversely of the direction of the cylinder axis so as to define a duct which varies in width along its length.

It will be apparent from the foregoing that a piston and cylinder construction fashioned according to the teachings of the present invention not only produces the improved results attained by prior devices through sharply increasing charge compression by reducing the volume of the charge as the top of the compression stroke of the piston is approached, but additionally uniformity of mixture of fuel vapor and air is insured and enhanced flame propagation upon ignition is also insured through the creation of severe turbulence in the combustion chamber.

The end result achieved is improved engine performance through more efficient fuel utilization.

We claim as our invention:

1. In an internal combustion engine, the combination comprising a cylinder, a head closing one end of said cylinder, and a piston reciprocable in said cylinder, said head and piston having step portions adapted to interfit as said piston approaches a top dead center position to define a pump chamber and combustion chamber, said step portions upon interfitting having faces disposed in spaced relation and formed to define a passage diminishing in cross section toward its edges and affording restricted communication between said chambers, a portion of the charge introduced into said cylinder being compressed in said pump chamber and forced therefrom through said passage in a generally centrally concentrated stream into said combustion chamber upon further movement of said piston toward top dead center position so as to create turbulence in the portion of the charge in said combustion chamber.

2. In an internal combustion engine, the combination comprising a cylinder, a piston reciprocable in said cylinder, and a head closing one end of said cylinder having a step including a planar face lying generally in the direction of travel of said piston, said piston having a step formed on its crown portion including a planar face lying generally in the direction of travel thereof, said steps interfitting with said faces overlapping as said piston approaches a top dead center position to define pump and combustion chambers, one of said faces being inclined with respect to the other to define a passage interconnecting said chambers and diminishing in cross-sectional area as said piston approaches a top dead center position.

3. In an internal combustion engine, the combination comprising a cylinder, a piston reciprocable in said cylinder, and a head closing one end of said cylinder having a step including a planar face lying generally in the direction of travel of said piston, said piston having a step formed on its crown portion including a planar face lying generally in the direction of travel thereof, said steps interfitting with said faces overlapping as said piston approaches a top dead center position to define pump and combustion chambers, said piston step face being inclined at its top edge portion to define with said head step face a passage interconnecting said chambers and diminishing in said cross-sectional area as said piston approaches a top dead center position.

4. In an internal combustion engine, the combination comprising a cylinder, a piston reciprocable in said cylinder, and a head closing one end of said cylinder having a step including a planar face lying generally in the direction of travel of said piston, said piston having a step formed on its crown portion including a planar face lying generally in the direction of travel thereof, said steps interfitting with said faces overlapping as said piston approaches a top dead center position to define pump and combustion chambers, said head step face being inclined along its lower edge portion to define with said piston step face a passage interconnecting said chambers and diminishing in said cross-sectional area as said piston approaches a top dead center position.

5. In an internal combustion engine, the combination comprising a cylinder, a piston reciprocable in said cylinder, and a head closing one end of said cylinder having a step including a face lying generally in the direction of travel of said piston, said piston having a step formed on its crown portion including a face lying generally in the direction of travel thereof, said steps interfitting with said faces overlapping as said piston approaches a top dead center position to define pump and combustion chambers, one of said faces being dished to define with the other of said faces an interconnecting passage between said chambers of diminishing cross-sectional area as said piston approaches a top dead center position and of diminishing cross-sectional area toward the outer extremities thereof.

6. In an internal combustion engine, the combination comprising a cylinder, a piston reciprocable in said cylinder, and a head closing one end of said cylinder having a step including a face lying generally in the direction of travel of said piston, said piston having a step formed on its crown portion including a face lying generally in the direction of travel thereof, said steps interfitting with said faces overlapping as said piston approaches a top dead center position to define pump and combustion chambers, said piston step face being dished to define with said head step face an interconnecting passage between said chambers diminishing in said cross-sectional area toward the outer extremities thereof and diminishing in cross-sectional area as said piston approaches a top dead center position.

7. In an internal combustion engine, the combination comprising a cylinder, a piston reciprocable in said cylinder, and a head closing one end of said cylinder having a step including a face lying generally in the direction of travel of said piston, said piston having a step formed on its crown portion including a face lying generally in the direction of travel thereof, said steps interfitting with said faces overlapping as said piston approaches a top dead center position to define pump and combustion chambers, said head step face being dished to define with said piston step face an interconnecting passage between said chambers diminishing in cross-sectional area toward the outer extremities thereof and of diminishing cross-sectional area as said piston approaches top dead center position.

8. In an internal combustion engine, the combination comprising a cylinder, a piston reciprocable in said cylinder, and a head closing one end of said cylinder including a step having side and top walls, said piston having a step formed on its crown portion including one face lying generally in the direction of travel thereof and a second face sloping outwardly and downwardly from said one face, said steps interfitting with said one face overlapping a portion of said side wall as said piston approaches a top dead center position to define pump and combustion chambers and an interconnecting passage therebetween opening toward said top wall, the stream of charge forced from said pump chamber through said passage into said combustion chamber impinging on said top wall and deflected thereby toward said side wall for deflection by it and by said second piston face, said second face being dished so as to concentrate the deflected charge stream centrally of said combustion chamber.

9. In an internal combustion engine, the combination comprising a cylinder, a piston reciprocable in said cylinder, and a head closing one end of said cylinder including a step having side and top walls, said piston having a step formed on its crown portion including one face lying generally in the direction of travel thereof and a second face sloping outwardly and downwardly from said one face, said steps interfitting with said one face overlapping a portion of said side wall as said piston approaches a top dead center position to define pump and combustion chambers and an interconnecting passage therebetween opening toward said top wall, the stream of charge forced from said pump chamber through said passage into said combustion chamber impinging on said top wall and deflected thereby toward said side wall for deflection by it and by said second piston face so as to create a swirling movement of the charge in the latter chamber.

10. In an internal combustion engine, the combination comprising a cylinder, a piston reciprocable in said cylinder, and a head closing one end of said cylinder including a step having side and top walls, said piston having a step formed on its crown portion including one face lying generally in the direction of travel thereof and a second face sloping outwardly and downwardly from said one face, said steps interfitting with said one face overlapping a portion of said side wall as said piston approaches a top dead center position to define pump and combustween opening toward said top wall, the stream of charge forced from said pump chamber through said passage into said combustion chamber impinging on said top wall and deflected thereby toward said side wall for deflection by it and by said second piston face so as to create a swirling movement of the charge in the latter chamber, said second face of said piston being concave.

11. In an internal combustion engine, the combination comprising a cylinder, a piston reciprocable in said cylinder, and a head closing one end of said cylinder including a step having side and top walls and adapted to receive a spark plug, said piston having a step formed on its crown portion including one face laterally offset from the axis of said piston and lying generally in the direction of travel thereof and a second face sloping outwardly and downwardly from said one face, said steps interfitting with said one face overlapping a portion of said side wall as said piston approaches a top dead center position to define pump and combustion chambers and an interconnecting passage therebetween laterally offset with respect to the axis of said cylinder and generally parallel thereto and lying generally along a chord of said cylinder and opening toward said top wall, the stream of charge forced from said pump chamber through said passage into said combustion chamber being directed toward said top wall for deflection thereby toward said side wall opposite the portion thereof overlapped by said one piston face, and from said side wall toward said second piston step face so as to create a turbulence in the charge in said combustion chamber having a vortex lying generally parallel to said one piston face and disposed between said second face thereof and the spark plug.

12. For use in an internal combustion engine having a cylinder and a head closing one end of said cylinder including a step having a transaxially disposed face partially overlying said cylinder and having a contiguous face disposed in generally parallel offset relation to the axis of said cylinder, a piston adapted to be reciprocable within the cylinder and having a step formed on its crown portion having a face disposed in generally parallel offset relation to the axis thereof and a contiguous planar face sloping from the first mentioned piston step face toward the periphery of said piston, said piston step being adapted to interfit with the head step so as to define pump and combustion chambers, said first mentioned piston step face being disposed in spaced relation to the corersponding head step face as said piston approaches a top dead center position to define an interconnecting passage between the chambers directed generally parallel to the piston axis.

13. For use in an internal combustion engine having a cylinder and a head closing one end of said cylinder having a step including a planar face lying generally in the direction of travel of said piston, a piston having a step formed on its crown portion including a planar face lying generally in the direction of travel thereof, said piston step being adapted to interfit with the head step so that said piston step face overlaps the corresponding face of said head step as said piston approaches a top dead center position so as to define pump and combustion chambers, said piston step face being inclined with respect to the corresponding head step face to define a passage interconnecting the chambers and diminishing in cross-sectional area as said piston approaches a top dead center position.

14. For use in an internal combustion engine having a cylinder and a head closing one end of said cylinder having a step including a face lying generally in the direction of travel of said piston, a piston having a step formed on its crown portion including a face lying generally in the direction of travel thereof, said piston step being adapted to interfit with the head step so that said piston step face overlaps the corresponding face of said head step as said piston approaches a top dead center position so as to define pump and combustion chambers, said piston step face being formed with respect to the corresponding head step face to define a passage interconnecting the chambers and diminishing in cross-sectional area toward the outer extremities thereof.

15. For use in an internal combustion engine having a cylinder and a head closing one end of said cylinder having a step including a planar face lying generally in the direction of travel of said piston, a piston having a step formed on its crown portion including a planar face lying generally in the direction of travel thereof, said piston step being adapted to interfit with the head step so that said piston step face overlaps the corresponding face of said head step as said piston approaches a top dead center position so as to define pump and combustion chambers, said piston step face being inclined at its top edge portion to define with the corresponding head step face a passage interconnecting the chambers and diminishing in cross-sectional area as said piston approaches a top dead center position.

16. For use in an internal combustion engine having a cylinder and a head closing one end of said cylinder having a step including a face lying generally in the direction of travel of said piston, a piston having a step formed on its crown portion including a face lying generally in the direction of travel thereof, said piston step being adapted to interfit with the head step so that said piston step face overlaps the corresponding face of said head step as said piston approaches a top dead center position to define pump and combustion chambers, said piston step face being dished to define upon overlapping the head step face an interconnecting passage between the chambers diminishing cross-sectional area as said piston approaches a top dead center position and of diminishing cross-sectional area toward the outer extremities thereof.

References Cited in the file of this patent

UNITED STATES PATENTS

| | | |
|---|---|---|
| 887,393 | Haselwander | May 12, 1908 |
| 2,072,574 | Witkowski | Mar. 2, 1937 |
| 2,161,132 | Burke | June 6, 1939 |
| 2,199,739 | Burke | May 7, 1940 |
| 2,254,438 | McCarthy | Sept. 2, 1941 |

FOREIGN PATENTS

| | | |
|---|---|---|
| 409,918 | Germany | Feb. 17, 1925 |
| 213,398 | Great Britain | Apr. 3, 1924 |
| 739,001 | France | Oct. 24, 1932 |